United States Patent
Eriksson et al.

(10) Patent No.: US 7,223,206 B2
(45) Date of Patent: May 29, 2007

(54) MOTOR VEHICLE WITH AUXILIARY BRAKE AND METHOD TO CONTROL SPEED CHANGE DURING SHIFTING SUCH A VEHICLE

(75) Inventors: Anders Eriksson, Gothenburg (SE); Mats Sabelstrom, Billdal (SE); Bengt Terborn, Olofstorp (SE); Peter Lingman, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/164,789

(22) Filed: Dec. 6, 2005

(65) Prior Publication Data

US 2006/0199698 A1 Sep. 7, 2006

Related U.S. Application Data

(63) Continuation of application No. PCT/SE2004/000496, filed on Mar. 31, 2004.

(30) Foreign Application Priority Data

Jun. 6, 2003 (SE) .................................... 0301661

(51) Int. Cl.
*B60W 10/00* (2006.01)
*B60W 10/04* (2006.01)
*B60W 10/18* (2006.01)
*F02D 9/06* (2006.01)

(52) U.S. Cl. ......................................... 477/188; 477/94

(58) Field of Classification Search .................. 477/92, 477/188; 701/70
See application file for complete search history.

(56) References Cited

U.S. PATENT DOCUMENTS 5,683,322 A * 11/1997 Meyerle ...................... 475/72
5,830,105 A    11/1998 Iizuka
RE36,007 E * 12/1998 White et al. ................... 477/91
7,014,592 B2 * 3/2006 Wiethe et al. ............... 477/120

FOREIGN PATENT DOCUMENTS

JP          09002105 A   *  1/1997
JP          10001036 A   *  1/1998

* cited by examiner

*Primary Examiner*—Tisha Lewis
(74) *Attorney, Agent, or Firm*—Novak Druce & Quigg, LLP

(57) ABSTRACT

Motor vehicle with an internal combustion engine, a transmission and at least a first and a second brake device. The first brake device acts directly on at least some of the wheels of the vehicle and the second brake device acts on the driving wheels of the vehicle via the transmission and is arranged before the clutch device of the transmission. The first brake device is activated when the second brake device is in an activated state and a shifting operation is started.

23 Claims, 5 Drawing Sheets

MOTOR VEHICLE WITH AUXILIARY BRAKE AND METHOD TO CONTROL SPEED CHANGE DURING SHIFTING SUCH A VEHICLE

CROSS-REFERENCE TO RELATED APPLICATIONS

The present application is a continuation patent application of International Application No. PCT/SE2004/000496 filed 31 Mar. 2004 which is published in English pursuant to Article 21(2) of the Patent Cooperation Treaty, and which claims priority to Swedish Application No. 0301 661-5 filed 6 Jun. 2003. Said applications are expressly incorporated herein by reference in their entireties.

FIELD OF THE INVENTION

The present invention relates to a motor vehicle with a first and a second brake device. The first brake device acts directly on at least some of the wheels of the vehicle and the second brake device acts on the driving wheels of the vehicle via the clutch device of the transmission. The first brake device is activated when the second brake device is in an activated state at the same time as a shifting operation is started.

The invention also relates to a method for bringing about a controlled speed change of a motor vehicle during a shifting operation and a computer program for implementing such a method using a computer.

BACKGROUND OF THE INVENTION

It is known to arrange auxiliary brakes in a vehicle as a supplement to the service brakes of the vehicle. Auxiliary brakes are used mainly in heavy-duty vehicles, such as trucks, buses and construction machinery for the primary purpose of sparing the service brakes of the vehicle. This is especially true when driving on long downhill gradients when it is important that the vehicle does not develop too high a speed. By making use of the auxiliary brakes, the service brakes can be preserved so that, when the vehicle really has to decelerate very strongly, they can deliver maximum braking force. The service brakes have a much more powerful braking effect than auxiliary brakes, partly due to the fact that the service brakes are normally arranged on all the wheels on the vehicle. The various types of auxiliary brake are arranged so as only to act on the driving wheels of the vehicle via the drive line of the vehicle. The terminology of "drive line" shall be used herein to mean the engine, transmission including clutch and gearbox, and final gear of the vehicle, as well as other components out to the driving wheels.

It is also known to differentiate between what are known as primary and secondary auxiliary brakes in a vehicle. Primary and secondary refer to the positioning of the auxiliary brake before or after the main gearbox of the vehicle and its clutch device. Examples of primary auxiliary brakes are ISGs (Integrated Starters and Generators) and retarders. A retarder is usually of the hydrodynamic or electromagnetic type. These are arranged between the engine and the main gearbox.

A primary auxiliary brake can also consist of various types of engine brake, for example a compression brake or exhaust-gas brake. The braking energy in a compression brake and an exhaust-gas brake is converted mainly to heat, which to a great extent is dissipated via the cooling system of the engine, but it should be noted that a considerable part (roughly 40% of the braking energy) leaves the vehicle via the exhaust pipe through the gas exchange of the engine.

A secondary auxiliary brake, which is arranged somewhere after the main gearbox of the vehicle and its clutch device, usually consists of a retarder of hydrodynamic or electromagnetic type. As the secondary auxiliary brake is arranged after the clutch device of the vehicle, it can brake even when the clutch is disengaged or when the gearbox is in neutral position.

As the primary auxiliary brake is arranged before the clutch device of the vehicle, it cannot brake when the clutch is disengaged; that is to say, when the clutch is disconnected, so that no torque is transmitted between engine and transmission. The result of this is that a primary auxiliary brake can brake the vehicle only when the clutch is engaged; that is to say, only when it transmits a braking torque from the auxiliary brake to the driving wheels. This means that the braking effect of the auxiliary ceases when disengagement takes place, for example in connection with shifting. This can cause problems on a steep downhill gradient, for example, in a case where the vehicle is equipped with a semi-automatic gearbox; that is to say, an automatically shifted manual gearbox. These gearboxes are often unsynchronized. When the downshift starts, the gearbox is disengaged which leads to the braking torque of the primary auxiliary brake being lost. There is then a risk that it will be possible for the speed of the vehicle to increase to such an extent that the lower gear can no longer be engaged.

SUMMARY OF THE INVENTION

An object of the invention is therefore to produce a motor vehicle where a controlled speed change is obtained during a shifting operation and also a method for obtaining a controlled speed change on a motor vehicle during a shifting operation.

In at least one embodiment, the invention takes the form of a motor vehicle with an internal combustion engine and a transmission. The vehicle further comprises (includes, but is not necessarily limited to) at least a first and a second brake device in which the first brake device acts directly on at least some of the wheels of the vehicle and the second brake device acts on the driving wheels of the vehicle via the transmission. Further, the second brake device is arranged before the clutch device of the transmission. The object(s) of the invention is achieved by virtue of the fact that the first brake device is activated when the second brake device is in the activated state and when a shifting operation is started.

The method according to the invention achieves the objectives of the invention by virtue of the steps of detecting that a shifting operation has been started and of activating the first brake device with a braking effect which corresponds to the braking effect of the second brake device.

By means of this first design of the motor vehicle according to the invention, a vehicle is obtained where the service brakes of the vehicle can compensate for the loss of a primary auxiliary brake when the clutch is disengaged. The advantage of this is that the speed change of the vehicle during a shifting operation can be controlled.

In an advantageous first development (variation) of the motor vehicle according to the invention, the braking effect is distributed between the various brake devices of the vehicle. The advantage of this is that the brake devices of the vehicle can be optimally utilized.

In an advantageous second development of the motor vehicle according to the invention, the braking effect is distributed between the vehicle and a towed vehicle coupled to the vehicle. The advantage of this is that the brake devices of the vehicle combination can be utilized optimally.

BRIEF DESCRIPTION OF THE DRAWINGS

The invention will be described in greater detail below with reference to illustrative embodiments that are shown in the accompanying drawings, and in which.

DETAILED DESCRIPTION

The illustrative embodiments of the invention described below with developments are to be seen only as examples and are in no way to be limiting of the scope of protection of the patent claims. In the illustrative embodiments described herein, the same reference number in the various figures relates to the same type of component. Each component is therefore not described in detail in all illustrative embodiments.

Figure 1:
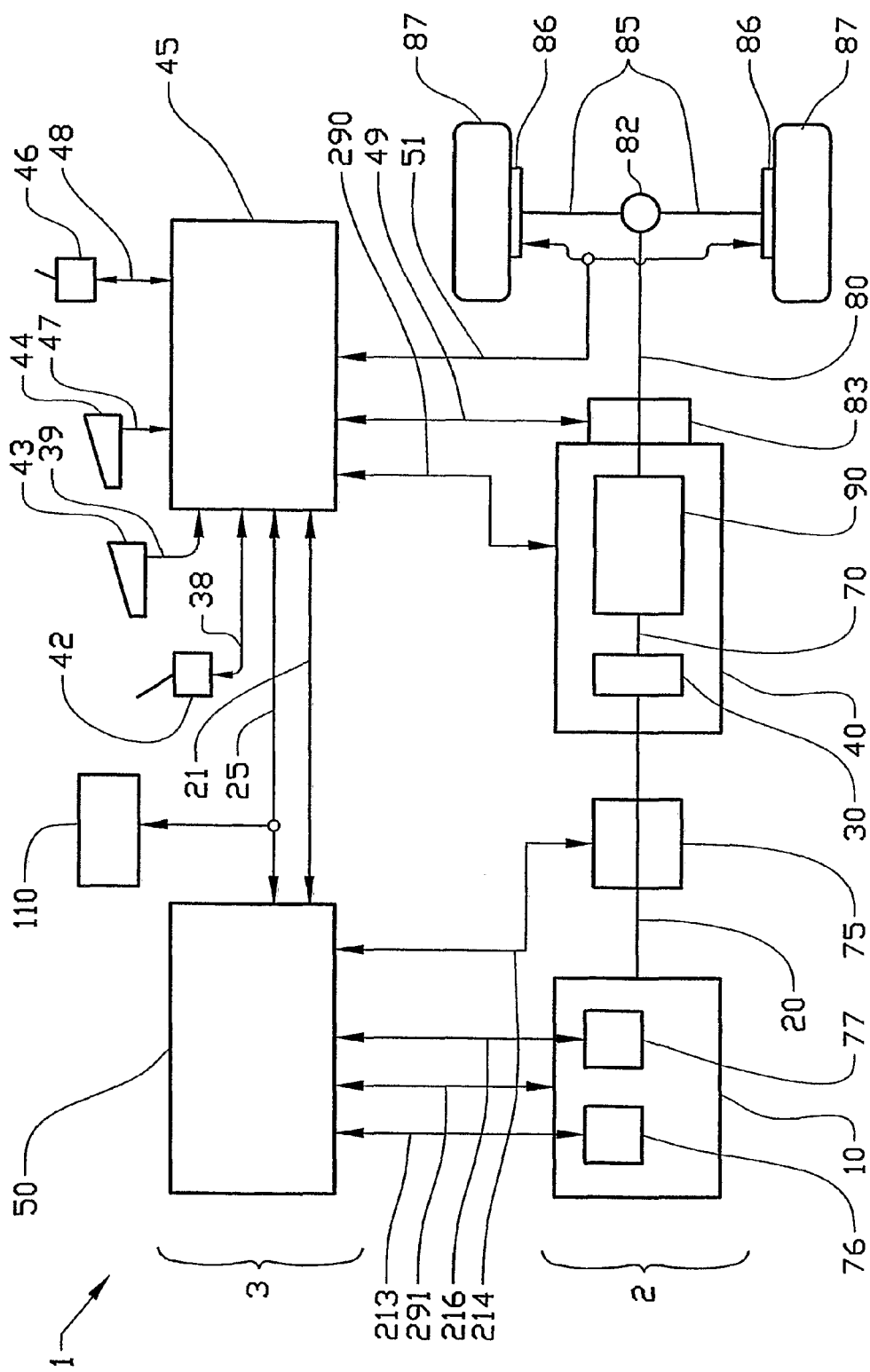
FIG. 1 shows a diagrammatic representation of a vehicle with a control system configured according to the teachings of the invention.

FIG. 1 shows a diagrammatic representation of a vehicle 1 with a control system 3 and a drive line 2 configured according to an embodiment of the present invention. The drive line 2 comprises an internal combustion engine 10, a transmission 40, a propeller shaft 80, a final gear 82 and wheel axles 85. The transmission 40 comprises a clutch 30 and a gearbox 90. The internal combustion engine 10 is, for example, a multi-cylinder diesel engine, the crankshaft 20 of which is connected to a clutch 30, as known to the skilled person. The clutch 30 is, for example, a dry disk clutch or a hydraulic clutch. The clutch 30 is connected to a gearbox 90, as known to the skilled person, via the input shaft 70 of the gearbox. The gearbox 90 is advantageously an automatically shifted, manual multi-stage gearbox which is unsynchronized. Other types of gearbox are also possible, for example a fully automatic gearbox with torque converter or a manual multi-stage gearbox with synchronization.

The gearbox 90 is coupled together with the propeller shaft 80 which, via a final gear 82 and driving axles 85 known to the skilled person, drives the driving wheels 87 of the vehicle. In this example, a vehicle with one driven axle is shown, but vehicles with more driving axles are also possible. The vehicle also comprises one or more non-driven wheel axles, for example a front axle and/or a running axle, with wheels (not shown) mounted thereto.

The driving wheels 87 of the vehicle are provided with wheel brakes 86, for example a disk brake or a drum brake; that is to say, brakes of the friction type. The other wheels of the vehicle are also provided with corresponding wheel brakes. The designation of "wheel brakes" includes both the wheel brakes, which brake the driving wheels, and the wheel brakes which brake non-driven wheels. The wheel brakes are controlled by compressed air via pneumatic or electric valves in a way known to the skilled person. There is advantageously a wheel brake on each wheel. On the other hand, it is possible, for example in order to optimize wear on the brakes, to control the braking force on each wheel or wheel axle individually. This may mean that the vehicle is in some cases not braked using all wheel brakes.

A primary auxiliary brake 75, for example a hydraulic (oil or water) or pneumatic retarder, is arranged on the shaft 20 between the engine 10 and the clutch 30. A break in the drive line when disengagement of the clutch 30 takes place leads to the primary auxiliary brake losing its braking effect on the driving wheels 87 of the vehicle. A first control unit 50 is arranged in order to control the retarder 75 via a line 214.

Communication on the line 214 can be effected using digital signals and/or analog signals. This is also the case for all other communication between the various units described below. In some cases, a data bus is preferable, for example when two control units are to communicate at high transmission rates and/or with large quantities of data. In other cases, an analog signal is preferable, for example for an analog sensor. The digital communication can be both parallel and serial.

The vehicle advantageously also comprises an exhaust-gas brake 76 and/or a compression brake 77, arranged in a known way in the internal combustion engine 10. These brakes are arranged so as to increase the exhaust-gas back pressure and thus to increase the engine-braking effect. The first control unit 50 is arranged so as to control the exhaust-gas brake 76 via a line 213. The compression brake 77 is controlled by the control unit 50 via a line 216.

A secondary auxiliary brake 83 is mounted on the propeller shaft 80 at the rear edge of the gearbox 90; that is to say, between the clutch 30 and the driving wheels 87 of the vehicle. The secondary auxiliary brake is operated, and controlled in a known way. The secondary auxiliary brake 83 can be a hydraulic or pneumatic retarder or an electromagnetic brake.

The primary auxiliary brake, the exhaust-gas brake and/or the compression brake are grouped together under the designation a second brake device. The wheel brakes and the secondary auxiliary brake are grouped together under the designation a first brake device.

The first control unit 50 is arranged so as to control the engine 10 via a line 291, and a second control unit 45 is arranged for control of the transmission via a line 290. The first and second control units are connected to one another via a line 21. It is described below how various processes and method steps take place in the second control unit 45, but it should be clear that the invention is not limited to this but that the first control unit 50, or a combination of the first and second control units, can just as well be used. Other control units (not shown) can also form part of a complete control system for the vehicle.

The first control unit 50 and/or the second control unit 45 are/is also arranged so as to control the secondary auxiliary brake 83 via a line 49 and also the wheel brakes 86 via a line 51. The brake devices are controlled using operating means known to the skilled person. The other wheel brakes of the vehicle are also arranged so as to be controlled by a control unit, for example control unit 45.

The vehicle 1 comprises a throttle control 44 and a gear selector 46 which are connected to the second control unit 45 via lines 47 and 48 respectively. The gear selector 46 is advantageously provided with a position for manual shifting and one for automatic shifting of the vehicle but can also be adapted for entirely manual shifting or for entirely automatic shifting. The throttle control 44 provides information about the gas application desired by the driver, for example by an analog signal. The gear selector 46 provides information about the gear selection desired by the driver.

The vehicle 1 comprises a brake control 43 in the form of a brake pedal which provides information via a line 39 about the braking force desired by the driver. Also included is an auxiliary brake control 42 which, via a line 38, provides the system with information about the inclusion of the auxiliary brakes desired by the driver. The auxiliary brake control 42 advantageously has a number of manual positions and a position for automatic auxiliary brake engagement.

The relationship between the various brake devices; that is to say, how much braking force is delivered by each brake device when the vehicle is braked, is regulated depending on various input data and settings. This applies to, for example, the relationship between exhaust-gas brake, compression brake and retarder and/or the relationship between wheel brakes and auxiliary brakes. This is known to the skilled person in the field and is therefore not further described.

The vehicle also comprises various sensors and detectors. These are included under the designation sensors 110. These are connected to the first or the second control unit via a line 25 which consists of a suitable number of conductors. The sensors 110 can, for example, comprise inductive sensors, temperature sensors and pressure sensors. The variable measured by a sensor is detected in one of the control units and can then be sent to the control unit which requires the information. This applies to, for example, the speed of the vehicle, which is detected by a sensor via one control unit but is then available to all the control units of the vehicle.

The input parameters which are used or can be used by the system comprise wheel speed, vehicle speed, brake pressure, brake pressure request/deceleration request, vehicle weight and driving resistance.

The first control unit is arranged so as to receive driving data, such as, for example, the instantaneous load of the engine, the speed of the vehicle and engine torque requested by the driver, from the sensors 110 and to process said driving data in order to calculate, for example, the instantaneous acceleration of the vehicle.

Figure 2:
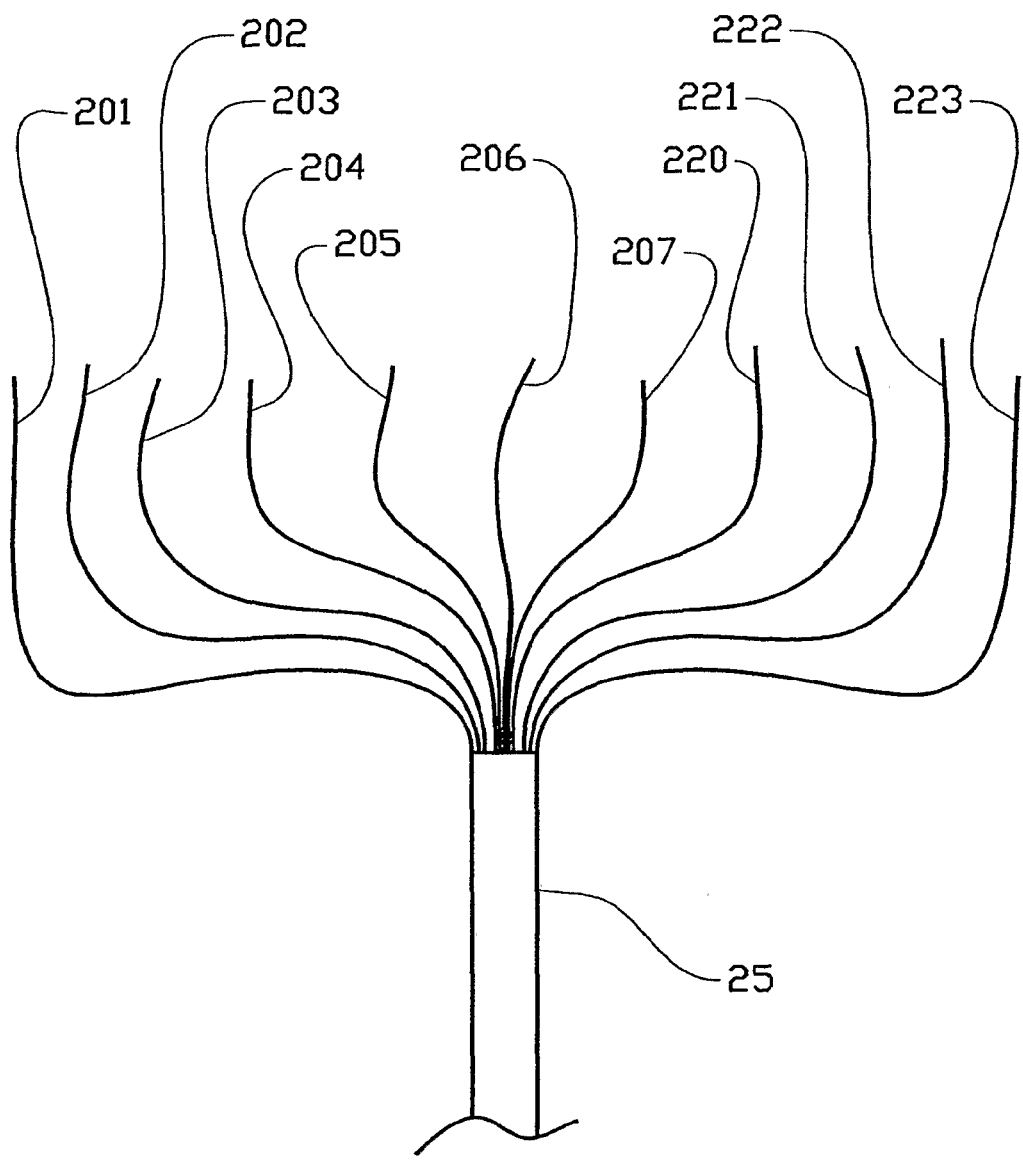
FIG. 2 shows a line with examples of data which is detected by sensors or calculated and is used according to an embodiment of the invention.

FIG. 2 shows diagrammatically the line 25 with examples of signals recorded or calculated by the sensors 110. Examples of detected or calculated instantaneous parameters are engine torque 201, the speed of the vehicle 202, engine torque requested by the driver 203, engine power 204, road inclination 205, driving resistance 206 and vehicle mass 207.

Other signals are referenced as 220, 221, 222 and 223. The signal 220 indicates that a primary auxiliary brake is activated, which auxiliary brake is activated and its braking effect. The signal 221 indicates that the wheel brakes are activated. The signal 222 comprises information about the engagement state of the clutch; that is to say, whether the clutch is disengaged or engaged. The signal 223 indicates that the control system is going to perform a shifting operation in the gearbox. These signals can, but do not have to be generated by sensors. They can also be generated by the system; for example, the signal 223 which indicates that the system is going to shift can be generated by the control unit 45.

The line 25 is coupled to the first control unit 50 and the second control unit 45. Depending on the type of sensor, the signals in the line 25 can be connected to one or both of the control units. For analog sensors, a signal is advantageously assigned to one control unit where the signal is converted. The value of the signal is subsequently available on a data bus, for example on the line 21. The control unit 45 is arranged so as to regulate the wheel brake 86 via the line 49. The control unit is also arranged so as, inter alia depending on the signals 220–223, to activate said wheel brake to compensate for the loss of the braking effect of said primary auxiliary brakes. According to one embodiment, the control unit can deactivate the wheel brakes when the signal 222 indicates that the clutch is engaged.

When the wheel brakes are activated in order to compensate for the loss of the braking effect of the primary auxiliary brakes, it is, advantageous if this activation is initiated before the clutch disengages. As it takes a little while for the wheel brakes to begin to brake, a jerk due to an acceleration change or a deceleration change can otherwise occur in the drive line as the braking effect of the primary retarder is lost at the same time as disengagement takes place. It is therefore advantageous if the signal 223 indicates that a shifting operation is going to be started a certain period of time before the clutch disengages. This period of time is suitably less than or around 1 second. The time it takes for the wheel brakes to compensate for the loss of braking effect of the primary retarder depends on, inter alia, the braking effect but is less than or around 1 second.

The signal 223 which comes a certain period of time before the clutch disengages functions simply on an automatically shifted, manual gearbox where the control system calculates the shifting operations. This signal does not exist for an entirely manual gearbox. It is therefore conceivable to detect when depression of the clutch pedal begins and to use this signal in the same way in order to indicate that a shifting operation is going to be started. Another possibility for manual gearboxes is to delay the shifting operation slightly, for example using a valve, so that the wheel brakes have time to compensate for the loss of braking effect of the primary auxiliary brake.

The signal 223 which indicates that a shifting operation is going to be started is important when the clutch is to disengage. When the clutch is to engage again; that is to say when the wheel brakes are to be deactivated and the primary auxiliary brake is to be activated again, the signal 222 which indicates the state of the clutch is used. When this signal indicates that the clutch is engaged, the wheel brakes are deactivated in a controlled way so that the total braking effect of the vehicle is constant when the primary auxiliary brake is activated again. As the time it takes for the auxiliary brake to recover the previous braking effect is longer than the time it takes for the wheel brakes to be deactivated, it is easy to compensate with the deactivation of the wheel brakes.

According to an alternative embodiment, the control unit 45 and/or 50 is arranged so as to activate the secondary auxiliary brake in order to compensate for the loss of the braking effect of the primary auxiliary brake during a shifting operation. The control unit can then also deactivate the secondary auxiliary brake when the shifting operation has been performed.

According to an alternative embodiment, the control unit 45 and/or 50 is arranged so as to activate both the wheel brakes and the secondary auxiliary brake in order to compensate for the loss of the braking effect of the primary auxiliary brake when a shifting operation takes place. The relationship between the braking effect of the wheel brakes and of the auxiliary brakes depends on, inter alia, the total braking effect requirement and the time it takes for the brakes to achieve the desired braking effect. The control unit can then also deactivate said wheel brakes and secondary auxiliary brake when the shifting operation has been performed.

Figure 3:
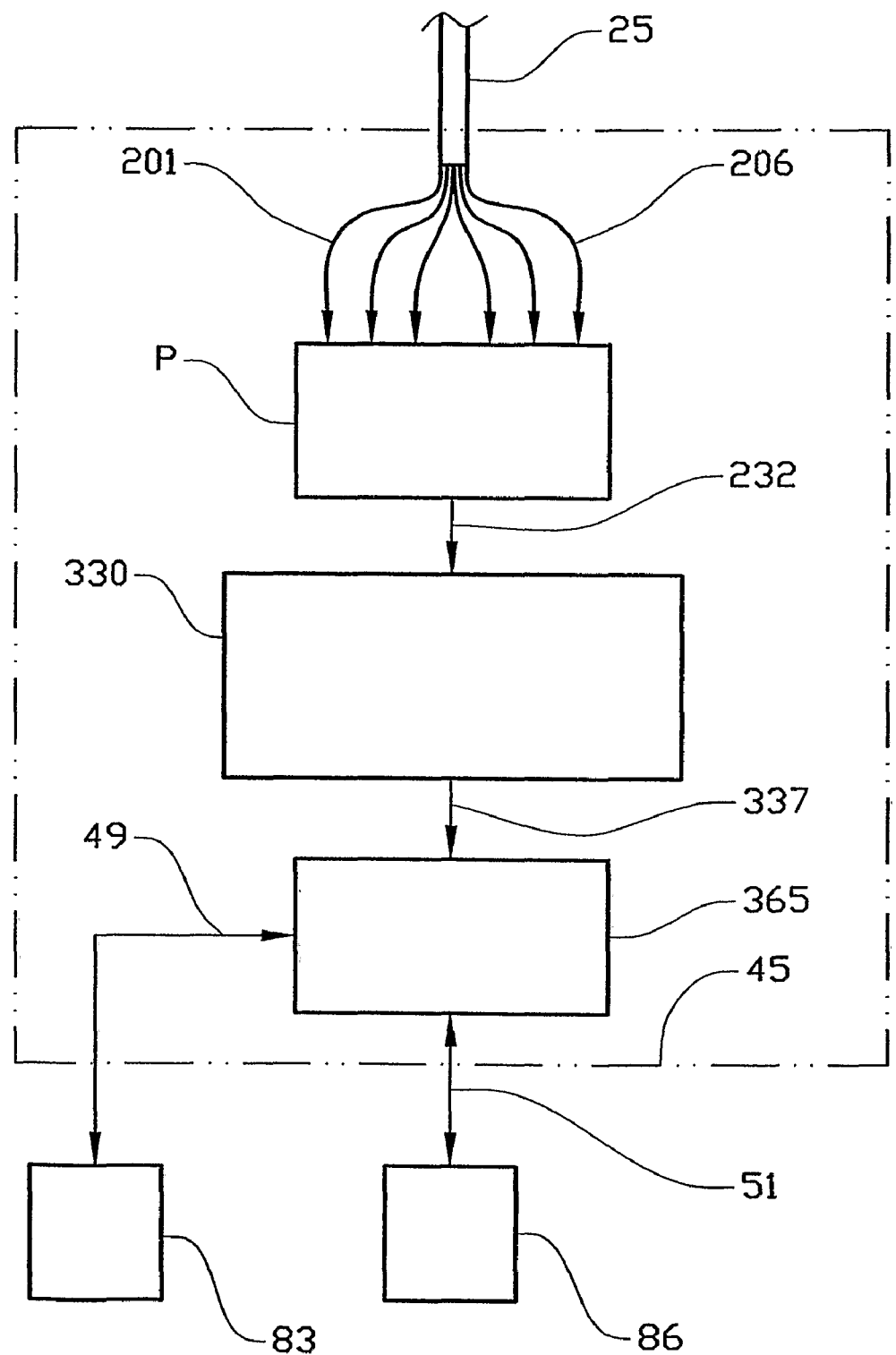
FIG. 3 illustrates diagrammatically a system according to an embodiment of the invention.

FIG. 3 illustrates an embodiment of the invention where the control unit 45 receives signals 201–207 from the sensors 110 via the line 25. Other signals received, for example via the line 25, are the signals 221–223. The signals are received in a data-processing unit P, for example a signal processor.

The data-processing unit P is arranged so as to process and to structure data from the sensors 110 and to forward the processed data to a calculating unit 330 via a data bus 232. The calculating unit 330 is arranged so as to calculate how and if the wheel brakes and/or the secondary auxiliary brake are to be activated and applied. The calculations can be adapted depending on certain input data, for example vehicle speed, vehicle weight, braking effect requested by the driver or which brakes are active. Depending on input data, the calculations generate a braking scheme.

The braking scheme is sent to a comparison unit 365 via a data bus 337. The comparison unit is arranged so as to compare the calculated braking scheme with a predefined braking scheme. Depending on input data on, for example, the state of the vehicle and the driving situation, the comparison unit determines which brakes are to be applied and the extent to which these brakes are to be applied. For example, the comparison unit can compare the calculated braking effect required in order to compensate for the loss of the primary auxiliary brake with a predefined minimum braking effect. Should the calculated braking effect be lower than the predefined minimum braking effect, the loss of braking effect does not need to be compensated.

The comparison unit can also, for example, compare the calculated braking effect necessary with the braking effect which the secondary auxiliary brake can deliver. If the calculated braking effect is greater than the braking effect available from the secondary auxiliary brake, the wheel brakes must also be used in order to compensate for the loss of braking effect.

The comparison unit is arranged so as to send control signals via the lines 51 and 49 to the wheel brakes 86 and the secondary auxiliary brake 83 respectively in order to apply the brakes according to the calculated braking scheme.

Figure 4A:
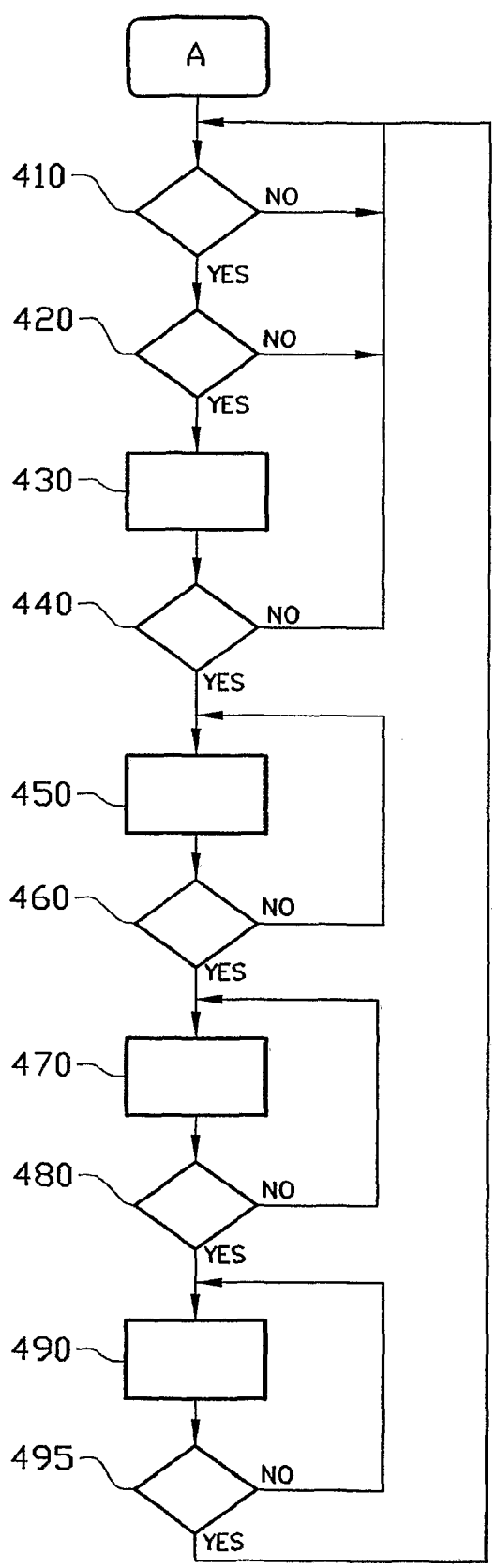
FIG. 4a shows a flow diagram illustrating a method according to an embodiment of the invention.

FIG. 4a shows a flow diagram illustrating a method according to an embodiment of the invention. After starting at A, which takes place when the vehicle is started, the system goes into a waiting mode 410 where the system waits for an indication that a shifting operation is going to be started. This waiting mode corresponds to the normal driving state of the vehicle when the system has information about the status of the vehicle, such as speed, deceleration, weight and the like. This indication can, for example, come from the control system of the vehicle when the vehicle is automatically shifted as it is then the system which determines when shifting is to take place. In a manually shifted gearbox, the signal can, for example, be obtained from a switch mounted at the clutch pedal which senses when depression of the clutch pedal begins.

When the system receives an indication that a shifting operation is going to be started, the system checks whether the primary auxiliary brake is activated in step 420. If the primary auxiliary brake is not activated, the system returns to waiting mode 410. If the primary auxiliary brake is activated, the system calculates to which extent and in which way the wheel brakes are to be applied in 430. The nature of this application depends on, for example, the instantaneous braking effect of the primary auxiliary brake, the speed of the vehicle, the inclination of the roadway, the weight of the vehicle and the like.

In step 440, the system compares the calculated braking effect requirement with a predefined braking effect requirement. When the primary auxiliary brake brakes with a small braking effect and/or when the speed of the vehicle is low, that is to say when the total braking effect requirement is low, this comparison can in some cases lead to compensation of the braking effect of the primary auxiliary brake not being necessary. This can occur when the system estimates that the braking effect requirement of the vehicle will lie below the predefined level. Below this level, the deceleration change during the shifting operation is judged to be so small that there is no risk of the speed of the vehicle becoming so high that it will not be possible to engage the new gear. In this case, the system returns to waiting mode 410.

If the system has found in step 440 that the braking effect of the primary auxiliary brake needs to be compensated, the wheel brakes are applied in step 450. The application takes place in the way calculated in step 430. At the same time, the braking effect of the primary auxiliary brake can be deactivated, for example by carrying out a controlled ramping-down of its braking effect. This also takes place in step 450. It is advantageous to deactivate the primary auxiliary brake before the clutch disengages as the load on the drive line is reduced when the clutch receives a smaller torque to disconnect. The application of the wheel brakes advantageously takes place in a way which corresponds to the ramping-down of the primary auxiliary brake so that the vehicle has a constant braking effect all of the time. Depending on various time constants, the primary auxiliary brake will be fully or partly deactivated when the clutch disengages. The system compensates for this. The braking effect of the primary auxiliary brake is advantageously fully deactivated when the clutch of the vehicle disengages. When the clutch is disengaged, which is indicated in step 460, the system regulates only the wheel brakes.

When the wheel brakes are applied, the braking force of the wheel brakes is regulated so that the deceleration of the vehicle is constant in step 470. Regulation takes place throughout the shifting operation. When the shifting operation has been performed, and the clutch is engaged, which is indicated in step 480, the system activates the primary auxiliary brake again in step 490. This takes place advantageously as a ramping-up of the braking effect of the primary auxiliary brake. At the same time as the primary auxiliary brake is activated, the braking effect of the wheel brakes is deactivated at the same rate so that the total braking effect of the vehicle is constant.

A shifting operation in which a constant deceleration is sought is described above. Depending on the driving situation, a constant acceleration may also be sought, for example when an upshift takes place. It is also possible that the deceleration or the acceleration is not to be entirely constant. This is the case when, for example, the vehicle is driven with one deceleration with one gear and a downshift gives another deceleration with the new gear. In this case, the deceleration during the shifting operation is to be changed steplessly from the deceleration before shifting to the deceleration after shifting. By controlling the speed change of the vehicle in this way, a high level of comfort for the driver is obtained, and jerks during the shifting operation are avoided.

When the primary auxiliary brake has recovered its braking effect and the wheel brakes are fully deactivated, the method comes to an end in step 495, and the system returns to the waiting mode 410.

Figure 4B:
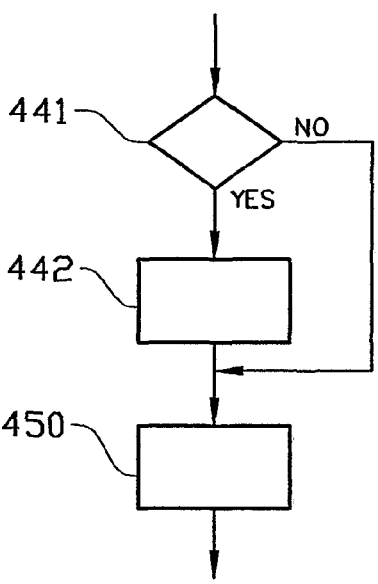
FIG. 4b shows a flow diagram illustrating an embodiment of the method according to the invention.

In a first development or variation of the method according to the invention, and which is shown in FIG. 4b, the method also comprises a function which distributes the braking effect between the wheel brakes and a secondary auxiliary brake. After method step 440, the system checks in step 441whether a secondary auxiliary brake is present, and if so, how much free braking effect is available. If there is no secondary auxiliary brake or if there is no free braking effect in the secondary auxiliary brake, the system continues with step 450. Otherwise the total braking effect requirement is distributed between the wheel brakes and the secondary auxiliary brake in step 442. The system then continues to step 450 where the braking effect of the wheel brakes is ramped up at the same time as the braking effect of the primary auxiliary brake is ramped down.

In a second development of the method according to the invention, the method also comprises a function which distributes the braking effect between the wheel brakes on the vehicle. This function is included in method step 450. This function distributes the braking effect between the wheel brakes of the vehicle, advantageously between the axles of the vehicle, but a distribution between separate wheel brakes is also possible. The distribution between the wheel brakes of the vehicle can be dependent on, for example, calculated wear of the wheel brakes or the maximum braking effect each wheel brake can deliver in combination with the tires mounted.

In a third development of the method according to the invention, a function is also included that distributes the braking effect between the wheel brakes on the vehicle and a towed vehicle coupled to the vehicle. This function is included in method step 450. This function distributes the braking effect between the wheel brakes of the vehicle and of the towed vehicle, advantageously between the axles of the vehicle and of the towed vehicle, but a distribution between separate wheel brakes is also possible. The distribution between the wheel brakes of the vehicle and of the towed vehicle can be dependent on, for example, the mass of the towed vehicle, type of towed vehicle, such as trailer, calculated wear of the wheel brakes or the maximum braking effect each wheel brake can deliver in combination with the tires.

Figure 5:
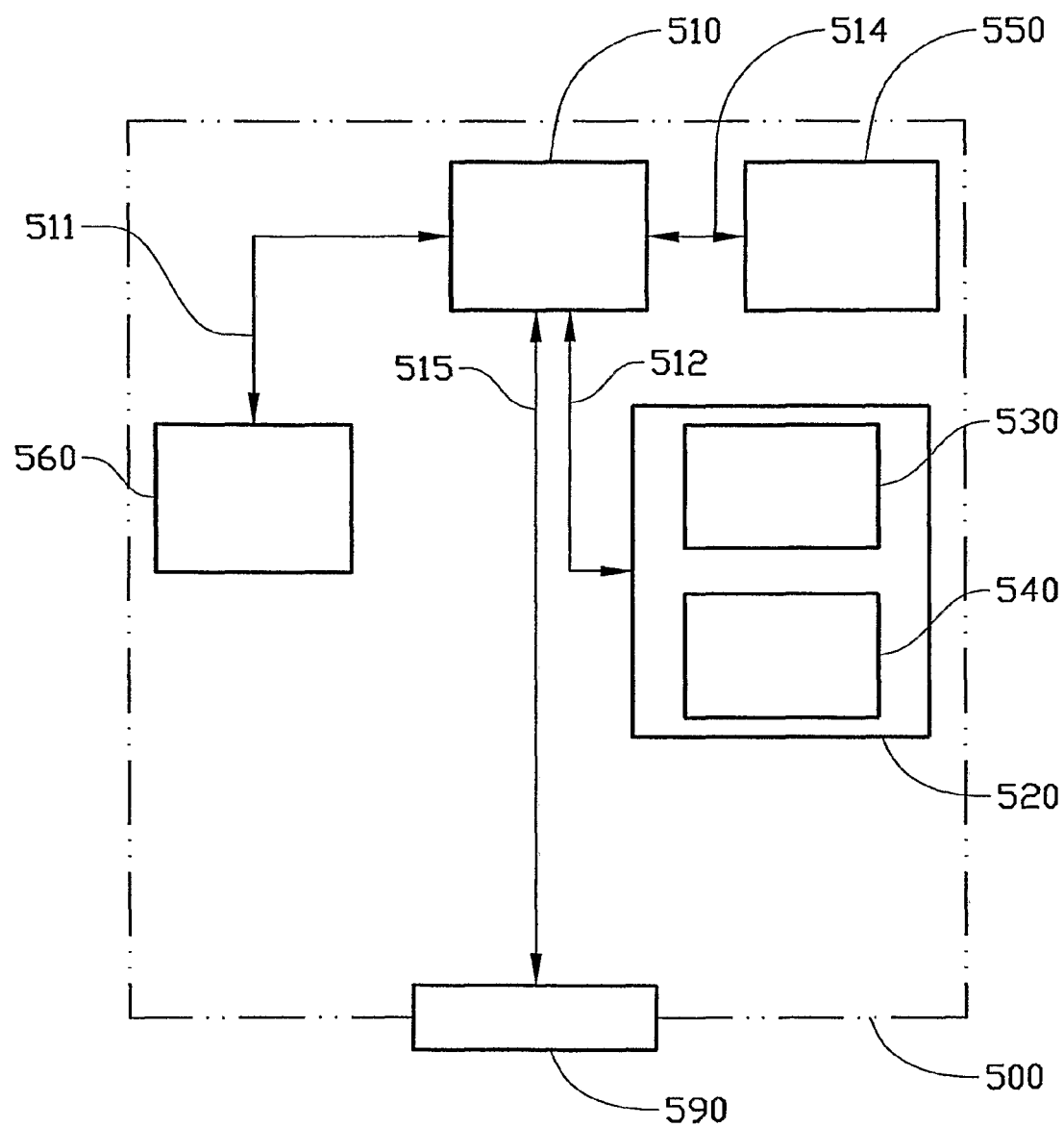
FIG. 5 shows an apparatus which is used according to at least one embodiment of the invention.

FIG. 5 shows an apparatus 500, according to an embodiment of the invention, comprising a non-volatile memory 520, a processor 510 and a read/write memory 560. The memory 520 has a first memory part 530 in which a computer program for controlling the apparatus 500 is stored. The apparatus 500 can be included in, for example, a control unit, such as the control unit 45 or 50. The data-processing unit 510 can comprise, for example, a microcomputer.

The memory 520 also has a second memory part 540 in which a program for implementing the method according to the invention in a motor vehicle is stored. In an alternative embodiment, the program for the method according to the invention in a motor vehicle is incorporated in a separate, non-volatile data storage medium 550, such as, for example, a CD or an exchangeable semiconductor memory. The program can be incorporated in an executable form or in a compressed state.

When the description above states that the data-processing unit 510 runs a special function, it should be clear that the data-processing unit 510 runs a special part of the program which is stored in the memory 540 or a special part of the program which is stored in the non-volatile data storage medium 550.

The data-processing unit 510 is adapted for communication with the memory 550 via a data bus 514. The data-processing unit 510 is also adapted for communication with the memory 520 via a data bus 512. The data-processing unit 510 is moreover adapted for communication with the memory 560 via a data bus 511. The data-processing unit 510 is also adapted for communication with a data port 590 via a data bus 515.

The method according to the invention and its developments can be implemented by the data-processing unit 510 by virtue of the data-processing unit 510 running the program which is stored in the memory 540 or the program which is stored in the non-volatile data storage medium 550.

The invention is not to be regarded as being limited to the illustrative embodiments described above, but a number of further variants and modifications are conceivable within the scope of the patent claims. For example, the invention can be utilized on all types of land-based vehicles which have a primary auxiliary brake, for example various types of construction machinery.

What is claimed is:

1. A motor vehicle comprising:
an internal combustion engine, a transmission, driving and non-driving wheels;
a first and a second brake device, said first brake device acting directly on at least some of the wheels of the vehicle and said second brake device acting on the driving wheels of the vehicle via the transmission; and
said second brake device is arranged before a clutch of the transmission and said first brake device is activated when said second brake device is in an activated state and when a shifting operation is started and whereby controlled braking effect is imparted to the motor vehicle when said first braking device is coupled to wheels of the vehicle while the second brake device is decoupled from the wheels of the vehicle during the shifting operation.

2. The motor vehicle as recited in claim 1, wherein said first brake device is deactivated when the shifting operation is finished.

3. The motor vehicle as recited in claim 1, wherein said second brake device is deactivated when the shifting operation is started.

4. The motor vehicle as recited in claim 3, wherein said first brake device is activated at the same time as the second brake device is deactivated so that the total braking effect is constant.

5. The motor vehicle as recited in claim 3, wherein said first brake device is deactivated and said second brake device is activated when the shifting operation is finished.

6. The motor vehicle as recited in claim 1, wherein said first brake device further comprises friction brakes mounted at the wheels of the vehicle.

7. The motor vehicle as recited in claim 1, wherein said first brake device comprises a secondary retarder mounted after the transmission of the vehicle.

8. The motor vehicle as recited in claim 7, wherein the braking effect of said first brake device is distributable between (1) the wheel brakes and (2) the secondary retarder of the vehicle.

9. The motor vehicle as recited in claim 1, wherein said second brake device comprises at least one of (1) a primary retarder, (2) a compression brake and (3) an exhaust-gas brake.

10. The motor vehicle as recited in claim 1, wherein said transmission further comprises an automatically shifted multi-stage gearbox.

11. The motor vehicle as recited in claim 1, wherein said motor vehicle consists of a vehicle combination comprising a traction vehicle and a towed vehicle.

12. The motor vehicle as recited in claim 11, wherein the braking effect of said first brake device is distributed between (1) the wheel brakes of the vehicle, (2) wheel brakes of the towed vehicle, and (3) the secondary retarder of the vehicle.

13. A method for obtaining a controlled speed change during a shifting operation for a vehicle including an internal combustion engine, a transmission, and first and second brake devices, wherein the first brake device acts directly on at least some of the wheels of the vehicle and the second brake device acts on driving wheels of the vehicle via the transmission and is arranged before a clutch device of the transmission so that controlled braking effect is imparted to the motor vehicle when said first braking device is coupled to wheels of the vehicle while the second brake device is decoupled from the wheels of the vehicle during the shifting operation, said method further comprising detecting that a shifting operation has been started and activating the first brake device with a braking effect which corresponds to the braking effect of the second brake device.

14. The method as recited in claim 13, further comprising deactivating the first brake device when the shifting operation has been finished.

15. The method as recited in claim 13, further comprising deactivating the second brake device when the shifting operation is started.

16. The method as recited in claim 15, further comprising activating the first brake device and deactivating the second brake device takes place at the same time so that the total braking effect is constant.

17. The method as recited in claim 16, further comprising deactivating the first brake device and activating the second brake device when the shifting operation is finished.

18. The method as recited in claim 13, further comprising said first brake device including at least one of (1) wheel brakes and (2) a secondary retarder.

19. The method as recited in claim 18, further comprising distributing the braking effect of the first brake device between at least one of (1) the wheel brakes and (2) the secondary retarder of the vehicle.

20. The method as recited in claim 13, wherein said second brake device comprises at lest one of (1) a primary retarder, (2) a compression brake and (3) an exhaust-gas brake.

21. The method as recited in claim 13, wherein said transmission comprises an automatically shifted multi-stage gearbox.

22. The method as recited in claim 13, wherein said method is performed via a computer program comprising program code for performing the method steps and which is executed by a computer.

23. The method as recited in claim 13, wherein said method is performed via a computer program product comprising program code stored on a computer-readable medium for implementing the method steps when said program is executed by a computer.

* * * * *